July 8, 1924.
A. McCRACKEN ET AL
1,500,249
TRACTION GRIP
Filed Nov. 12, 1918
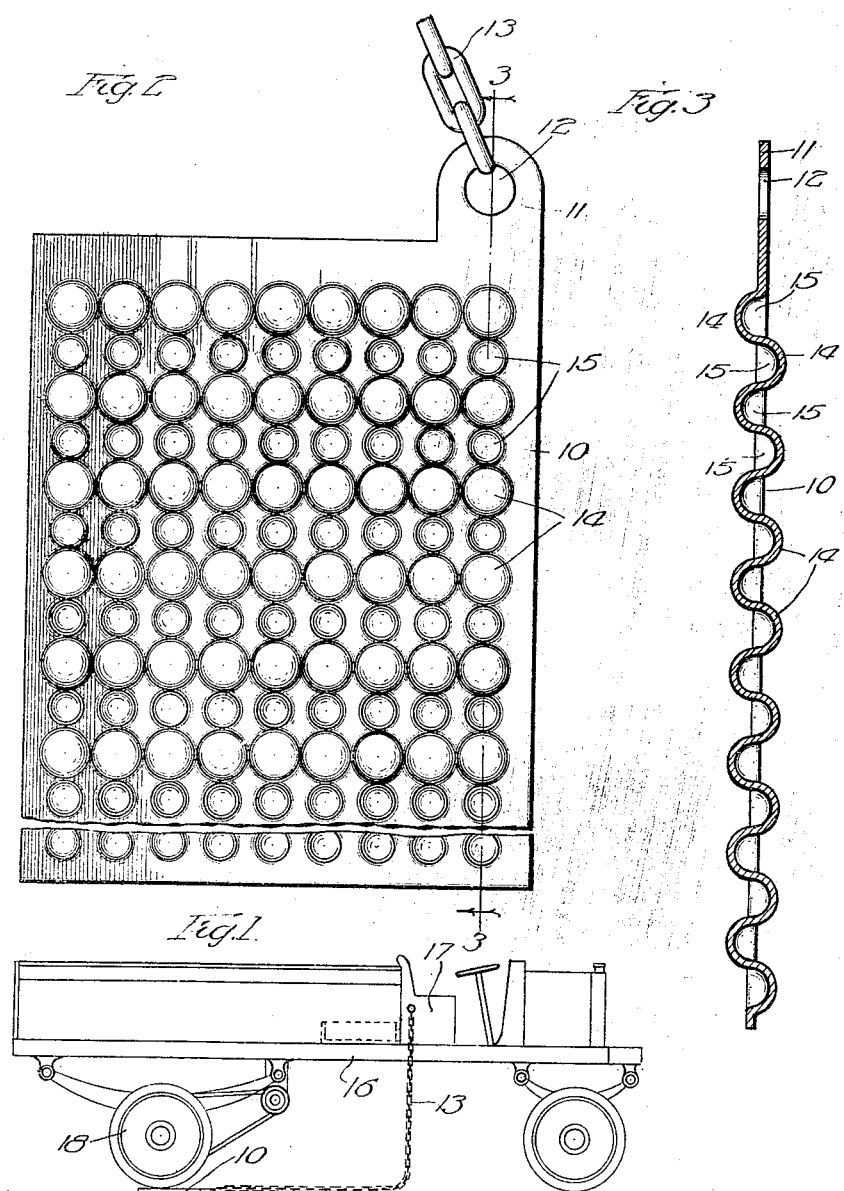

Patented July 8, 1924.

1,500,249

UNITED STATES PATENT OFFICE.

ARTHUR McCRACKEN AND WILLIAM V. MONROE, OF CHICAGO, ILLINOIS.

TRACTION GRIP.

Application filed November 12, 1918. Serial No. 262,151.

*To all whom it may concern:*

Be it known that we, ARTHUR MCCRACKEN and WILLIAM V. MONROE, citizens of the United States, and both residing in Chicago, in the county of Cook and State of Illinois, have invented certain new and useful Improvements in Traction Grips, of which the following is a specification.

Our invention relates to traction grips and has particular reference to a means for preventing the skidding of traction wheels of self propelled road vehicles.

The principal objects of the invention are to provide improved means for enabling the traction wheels of a self propelled road vehicle to secure a purchase or traction in the event that said wheels develop a tendency to spin idly, particularly in case the roadway is covered with snow, although it is obvious that the invention may be utilized in other cases of loss of traction; to provide an arrangement whereby the operator of the road vehicle is relieved from the necessity of dismounting after the traction has been secured and the vehicle has moved forward or backward, as the case may be; to provide an improved arrangement which will not injuriously affect the tire of the vehicle wheel and which does not involve damaging the road surface; to provide an improved arrangement which will not be rendered ineffective by reason of the backing or clogging action of the snow or other material of the road surface; to provide an improved arrangement which is simple and convenient to manipulate and the application of which does not require the doing of mechanical work upon the vehicle or parts thereof; to provide an improved device which shall be simple in design, rugged in construction, economical to manufacture, and in general to provide an improved arrangement of the character referred to.

In the drawings, which illustrate a preferred embodiment of our invention, Fig. 1 is an elevation of a motor vehicle showing the application of our invention. Fig. 2 is a plan view of the principal part of the device, and Fig. 3 is a section taken on line 3—3 of Fig. 2.

Referring to the drawings, the reference numeral 10 represents a plate of steel or other suitable material which can be pressed or stamped to the desired shape and which will at the same time maintain its configuration under the conditions encountered in actual service. Said plate 10 as shown is of substantially rectangular shape in outline plan and at one corner thereof is furnished with an ear or lug 11, perforated, as shown at 12, in order to facilitate the connection of a suitable link chain 13.

As will be seen from an inspection of Figs. 2 and 3, the plate 10, by means of suitable dies, has been so formed or impressed as to provide upon each side of the plate a plurality of knobs or protuberances 14, and depressions 15, the knobs 14 representing the metal of the plate which has been forced outwardly by reason of the indenting of the depressions 15. It will be noted that the thickness of the plate at the knobs or depressions is substantially the same as the thickness of the unformed original thickness of the plate itself, although, of course, it will be understood that by reason of the forming operation and increased area of metal, there is some slight diminution of the thickness of the metal.

It will be observed that the protuberances 14 and the depressions 15 extend in rows substantially across the width of the plate 10, the adjacent protuberances in each row substantially touching each other, while the depressions 15 on the other side of such protuberances are, of course, slightly spaced apart, although of the same actual spacing as the protuberances themselves. By inspection of Fig. 3, it will be seen that in effect the rows of depressions and knobs which are arranged in alternate relation and extend across the plate constitute, in effect, corrugations, although such corrugating effect may in certain instances be obtained by employing protuberances having a shape other than the hemispherical shape which we have herein disclosed; we prefer the hemispherical contour for the reason that the stamping or forming of the plate is thereby considerably facilitated, in addition to which, such a shape, as we have found by actual experience, is practically self-cleaning and does not tend to become clogged by snow or other material; also, it will be manifest that by reason of this matter of forming the surface of the plate, the strength and rigidity of the latter is materially enhanced over that of an ordinary flat plate or that of a plate which is simply provided with continuous transverse corrugations.

In actual practice, the traction plate 10 is more or less permanently secured or connected to the frame 16 of the vehicle, by means of the chain 13, said chain being suitably arranged in proximity to the seat 17 of the driver, and being long enough to enable the traction wheel 18 of the vehicle to clear the plate as the vehicle moves forward.

The operation of the device will be manifest by inspection of Fig. 1, which shows plate 10 inserted between the road surface and the tire of the traction wheel 18, the truck being shown in the act of climbing forward by reason of the increased traction thereby obtained. When the traction wheel rolls off the plate 10, the latter may, of course, be retrieved by the driver by simply pulling up on the chain 13, so that it is unnecessary for him to dismount from the vehicle after traction has been secured. It will be observed that both sides of the plate are similarly formed so that the protuberances will engage the surface of the tire as well as the surface of the roadway. The tire material is, however, not damaged in any way for the reason that there are no sharp surfaces to tear the rubber or other material.

It will, of course, be apparent to those skilled in the art, that the particular details of construction herein shown may be modified without departing from the spirit of the invention, the scope of which should be determined by reference to the appended claims.

We claim as our invention:

1. A traction grip for insertion under one of the traction wheels of a self-propelled road vehicle, which comprises a suitably stamped sheet metal plate provided with transversely extending rows of depressions forming projections alternately arranged on opposite sides of said plate, said depressions being substantially hemispherical in shape and being formed out of the metal of the plate whereby corresponding substantially hemispherical rounded protuberances are provided on the opposite sides of the plate.

2. In a traction grip for a road vehicle, the combination of a sheet metal plate adapted to be placed on the ground to afford a traction surface for the vehicle wheel, said plate having parallel rows of projections, each row being stamped alternately from the opposite side of the plate to afford parallel rows of recesses and projections on one side of the plate to engage the ground and parallel rows of recesses and projections on the other side to engage the wheel.

ARTHUR McCRACKEN.
WILLIAM V. MONROE.